(No Model.)

S. GING.
BELT FASTENER.

No. 451,041. Patented Apr. 28, 1891.

Witnesses:
John Imwie
L. J. Higdon

Inventor:
Samuel Ging
By his Attorneys
Higdon & Higdon

UNITED STATES PATENT OFFICE.

SAMUEL GING, OF EDGEWOOD, ILLINOIS, ASSIGNOR OF ONE-HALF TO THOMAS J. GERBEL, OF SAME PLACE.

BELT-FASTENER.

SPECIFICATION forming part of Letters Patent No. 451,041, dated April 28, 1891.

Application filed February 11, 1891. Serial No. 381,023. (No model.)

*To all whom it may concern:*

Be it known that I, SAMUEL GING, of Edgewood, Effingham county, Illinois, have invented certain new and useful Improvements in Belt-Fasteners, of which the following is a full, clear, and exact description, reference being had to the accompanying drawings, forming a part hereof.

My invention relates to fastening devices for machine-belts; and it consists in the novel combination and arrangement of parts hereinafter described and claimed.

Figure 1:
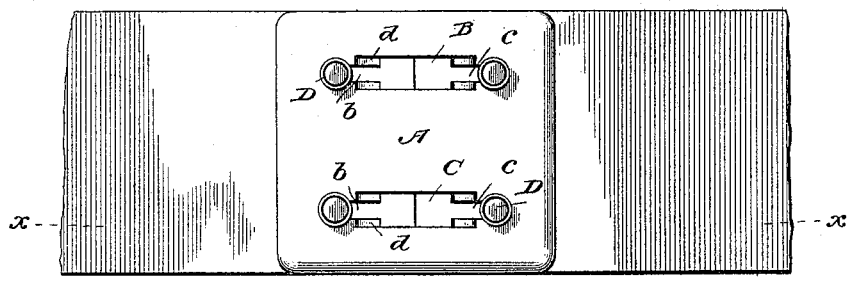
Figure 2:
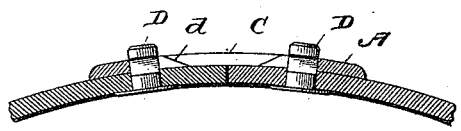
Figure 3:
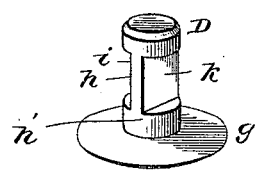

In the accompanying drawings, forming a part of this application, and in which like letters indicate corresponding parts throughout the several figures, Figure 1 is a plan view of the device attached to a belt. Fig. 2 is a section on line $x$ $x$ of Fig. 1, and Fig. 3 is a detail perspective view of one of the buttons or rivets used to attach the device to the belt.

Referring to the drawings by letter, A indicates the plate forming the main feature of the device. This is to be made of such a size as to conform to the width of the belt upon which it is to be used, and is provided with rectangular longitudinal slots B and C, preferably two in number, which have recesses or extensions $b$ and $c$ at the ends thereof. At the junction of the main portions of these slots with the recesses shoulders $d$ are formed, the object of which will appear farther on. To fasten the plate to the belt, buttons D are made use of, which buttons consist of a flat and preferably circular base $g$, having a cylindrical body $h$ rising from the center thereof. Recesses $i$ and $k$ are formed in opposite sides of the part $h$ and at such a distance from the base thereof that the shank portion $h'$ is about the same thickness as the belt.

To apply the belt-fastener, a proper number of holes are punched in the ends of the belt at predetermined points and the buttons inserted therethrough in such a manner that the flat central portions of the same shall lie parallel with the length of the belt. The heads of the buttons are then inserted through the slots from the inner side of the plate, and by means of sufficient tension the said heads will be drawn up the beveled shoulders $d$ and will rest upon the plain upper surface of the plate A, the flattened portions of the buttons then being in the recesses $c$, as will be understood. The holes for the buttons are punched at such points that when the fastener is in position the ends of the belt will meet, thus avoiding overlapping edges and obtaining a smooth under surface. The beveled faces at the ends of the slots serve to press the heads of the buttons against the under side of the belt and to force the parts tightly together.

From the above description it will be seen that my improved fastener is simple, strong, and can be easily applied. The buttons are the only parts which there is any possibility of breaking, and in case of such breakage new ones can be supplied with great facility.

Having thus described my invention, what I claim as new, and desire to secure by Letters Patent, is—

1. A belt-fastener consisting of a plate provided with longitudinal slots, reduced extensions or recesses at each end of said slots, beveled shoulders at each end of the main slots, one on either side of the said extensions, and rivets adapted to secure said plate to the belt, substantially as described.

2. A belt-fastener consisting of a plate provided with longitudinal slots, reduced extensions or recesses at each end of said slots, beveled shoulders, one on either side of the entrance of said recesses, and buttons D, adapted to rest in the recesses, said buttons being provided with a shank portion $h'$ of the thickness of the belt and opposite recesses $i$ and $k$ in the body thereof, substantially as described.

In testimony whereof I affix my signature in presence of two witnesses.

SAMUEL GING.

Witnesses:
FRED SMITH,
THOS. J. GERBEL.